(12) United States Patent
Lindsay et al.

(10) Patent No.: US 10,563,776 B1
(45) Date of Patent: Feb. 18, 2020

(54) FLUIDIC OSCILLATOR DEVICE

(71) Applicant: Facebook Technologies, LLC, Menlo Park, CA (US)

(72) Inventors: Jack Lindsay, Seattle, WA (US); Sean Jason Keller, Kirkland, WA (US); David R. Perek, Bellevue, WA (US); Tristan Thomas Trutna, Seattle, WA (US); Nicholas Roy Corson, Mukilteo, WA (US); Raymond King, Redmond, WA (US)

(73) Assignee: Facebook Technologies, LLC, Menlo Park, CA (US)

(*) Notice: Subject to any disclaimer, the term of this patent is extended or adjusted under 35 U.S.C. 154(b) by 141 days.

(21) Appl. No.: 15/830,729

(22) Filed: Dec. 4, 2017

Related U.S. Application Data

(60) Provisional application No. 62/433,620, filed on Dec. 13, 2016.

(51) Int. Cl.
*F16K 7/17* (2006.01)
*F16K 31/126* (2006.01)
*F16K 51/00* (2006.01)
*G06F 3/01* (2006.01)

(52) U.S. Cl.
CPC ............. *F16K 7/17* (2013.01); *F16K 31/126* (2013.01); *F16K 51/00* (2013.01); *G06F 3/014* (2013.01); *G06F 3/016* (2013.01)

(58) Field of Classification Search
CPC .... F16K 41/103; F16K 15/148; F16K 15/202; F16K 31/0672; F16K 7/17; F16K 31/126; B60L 53/20; B60K 1/04; H01M 2/362
See application file for complete search history.

(56) References Cited

U.S. PATENT DOCUMENTS

2010/0263757 A1* 10/2010 Fernandes ......... B01L 3/502707
137/832

* cited by examiner

*Primary Examiner* — P. Macade Nichols
(74) *Attorney, Agent, or Firm* — FisherBroyles, LLP

(57) ABSTRACT

The disclosure describes a fluidic oscillator. The fluidic oscillator is configured to oscillate between a closed state and an open state. The fluidic oscillator comprises an oscillator conduit forming an oscillator chamber comprising an inlet and an outlet wherein the inlet and the outlet are configured to enable fluid flow through the oscillator chamber. An inner chamber of the oscillator chamber further includes a flexible element wherein a rate of fluid flow through the oscillator chamber results in a deformation in the flexible element. In other elements, the fluid oscillator further comprises two fluidic gates comprising a deformable chamber wherein changes in a control pressure of a control fluid in the deformable chamber results in a deformation in a volume of the oscillation chamber.

20 Claims, 9 Drawing Sheets

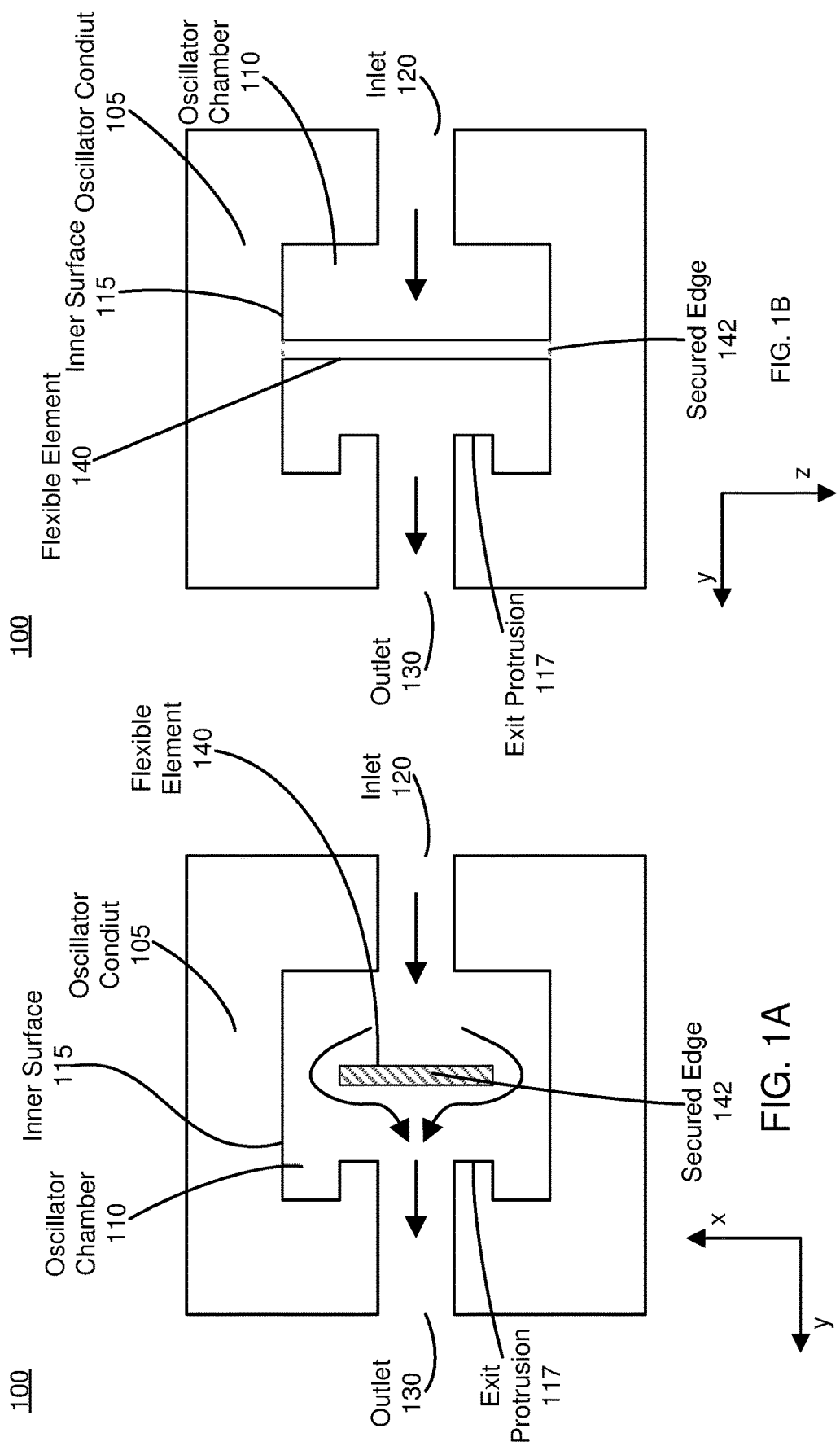

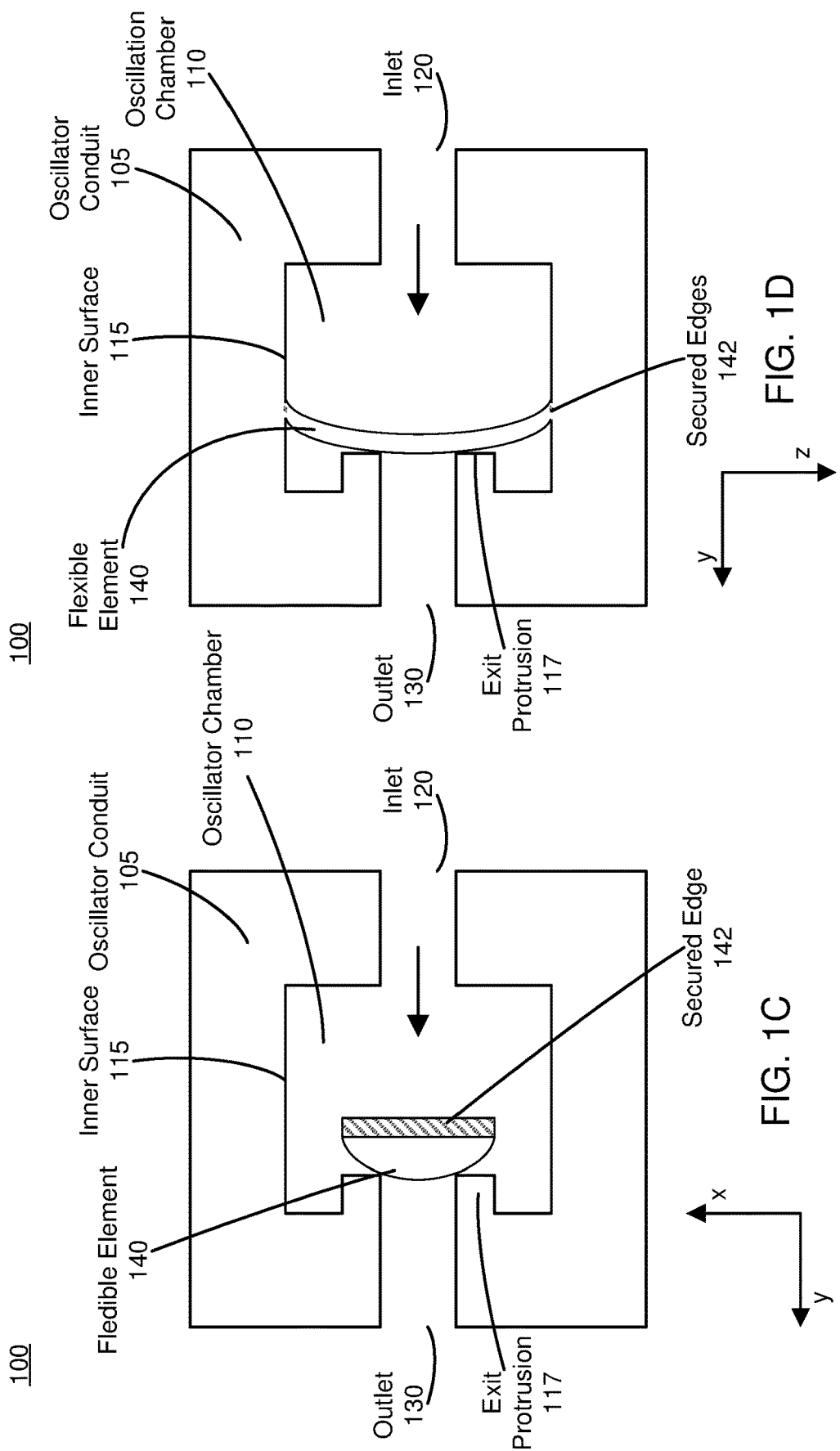

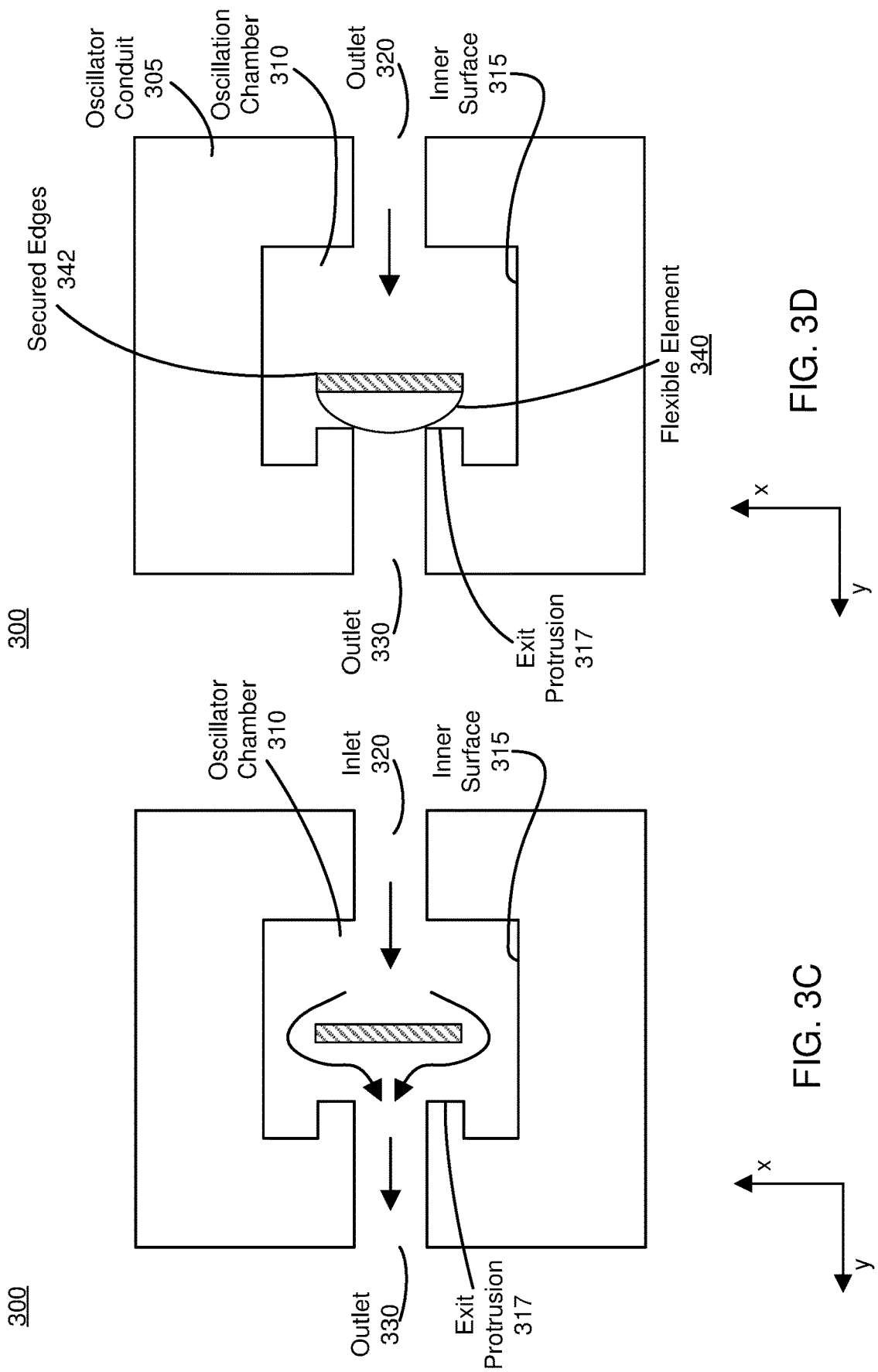

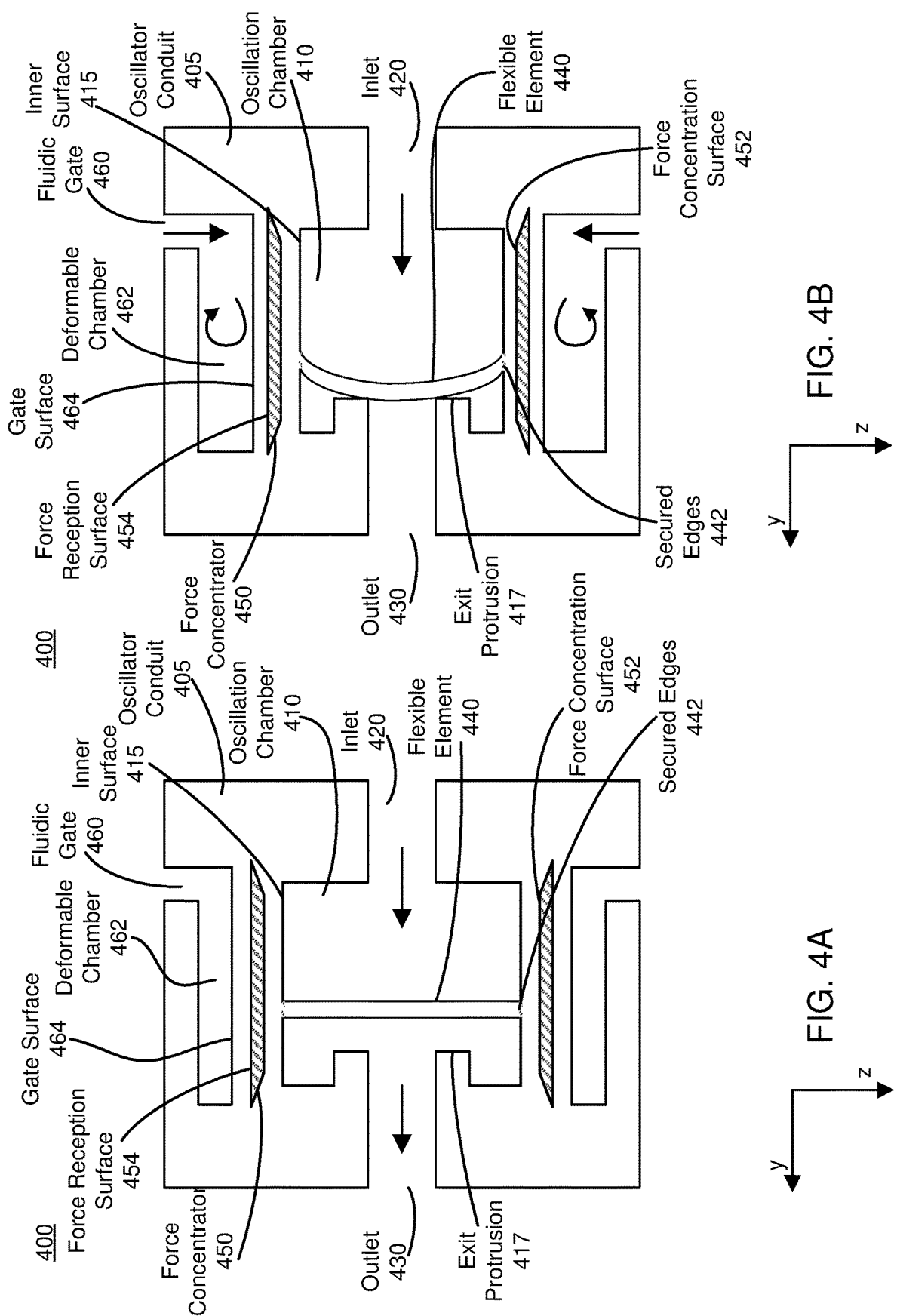

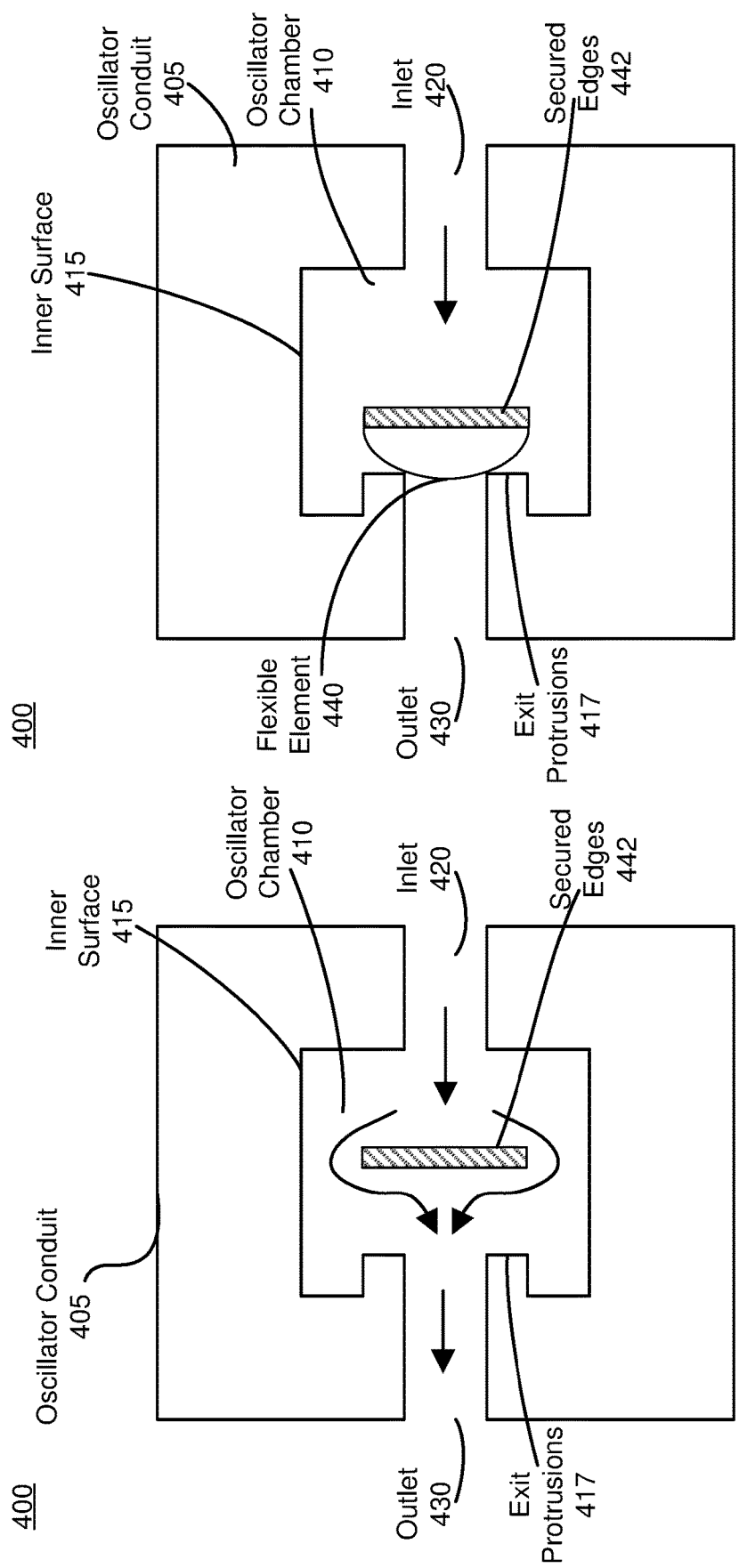
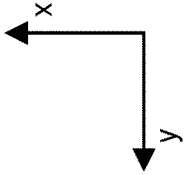
FIG. 4D
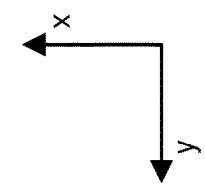
FIG. 4C

FLUIDIC OSCILLATOR DEVICE

CROSS REFERENCE TO RELATED APPLICATIONS

This applications the benefit of U.S. Provisional Application No. 62/433,620, filed on Dec. 13, 2016, which is hereby incorporated by reference in its entirety.

BACKGROUND

The present disclosure generally relates to fluidic devices for head-mounted displays (HMD) and more specifically to using fluidic devices in virtual reality systems.

Virtual reality (VR) is a simulated environment created by computer technology and presented to a user through a VR system. In some VR systems, a user interacts with virtual objects using a wearable device (e.g., a glove). Electronics on wearable devices can be complex, bulky, and heavy. As a result, conventional wearable devices can detract from a user's experience with a VR system.

SUMMARY

Embodiments of the disclosed subject matter include fluidic devices used in, e.g., haptic devices of artificial reality systems. Fluidic devices manipulate fluids in a manner similar to one or more circuit elements (e.g., resistor, capacitor, a transistor, a diode, or any combination thereof) in an electrical system. In some embodiments, fluidic devices are coupled together to act as controllers for a haptic apparatus on a wearable device (e.g., a haptic glove) for an artificial reality system. Fluidic devices are modular and may be coupled together to form a composite fluidic device.

A fluidic device comprises a fluidic oscillator. The fluidic oscillator includes an oscillator conduit that forms an oscillator chamber with an inlet and an outlet such that fluid from the inlet to the outlet. The oscillator chamber also includes a flexible element that reversibly constricts the flow of fluid flowing through the oscillator chamber. In various embodiments, at least two edges of the flexible element are coupled to an inner surface of the oscillator conduit. Here, the flexible element is configured to deform towards the output of the oscillator conduit in the presence of fluid flow. In an embodiment, a fluid's flow rate greater than a threshold flow rate causes the flexible element to deform towards the outlet.

In one or more embodiments, the flexible element is configured such that a deformation in the flexible element results in the fluidic device entering a closed state. Here, an "open state" is associated with a maximum rate of flow between the inlet and the outlet while a "closed state" is associated with a minimum rate of fluid flow between the inlet and the outlet. In various embodiments, the fluidic device is further configured to oscillate between a closed state and an open state wherein the frequency of oscillation is based on a distance between the flexible element and an exit surface, a cross-sectional area of the flexible element, and a cross-sectional area of the oscillator chamber based on a distance between the flexible element and an exit surface, a cross-sectional area of the flexible element, and a cross-sectional area of the oscillator chamber. An oscillation of the fluidic device between a closed state and an open state due to fluid flow may be associated with a mechanical vibration of fluidic oscillator.

In some embodiments, the fluidic oscillator includes one or more gates that enable active control of the fluidic oscillations. Such gates are formed in the oscillator conduit adjacent to the oscillator chamber. To control the fluidic oscillations, a fluid controller (e.g., a hydraulic actuator) pushes a control fluid into the gate. The fluidic gates are associated with a deformable chamber such a fluid flowing into the fluidic gate is stored in a deformable chamber. In various embodiments, as the control fluid fills the deformable gate, a gate surface adjacent to the oscillator chamber deforms the oscillator conduit and therefore deforms the inner surface of the oscillator chamber. In various embodiments, the changed shape of the inner surface of the oscillator chamber modifies the frequency of the fluidic oscillator.

Fluidic devices are generally composed of one or more flexible base materials. In some embodiments, in addition to the base materials, other materials with a measure of rigidity higher than that of the base material are co-casted with these base materials to form co-casted fluidic devices. Co-casted fluidic devices facilitate integration of additional elements such as rigid elements which may functionally act like force concentrators into a fluidic device. In various embodiments, the rigid elements increase the deformation of the inner surface of the fluidic oscillator for a given control pressure of the control fluid. As a result, a controller may affect a greater change in the frequency of the fluidic oscillator for a given control pressure.

BRIEF DESCRIPTION OF THE FIGURES

FIG. 1A is a planar sectional view of a fluidic oscillator device, in accordance with an embodiment.

FIG. 1B is a lateral sectional view of the fluidic oscillator device illustrated in FIG. 1A, in accordance with an embodiment.

FIG. 1C is a planar sectional view of a fluidic oscillator device illustrated in FIG. 1A in a closed state, in accordance with an embodiment.

FIG. 1D is a lateral sectional view of the fluidic oscillator device illustrated in FIG. 1C in the closed state, in accordance with an embodiment.

FIG. 3C illustrates a lateral sectional view of the fluidic oscillator device with fluidic gates in an open state depicted in FIG. 3A, in accordance with an embodiment.

FIG. 3D illustrates a lateral sectional view of the fluidic oscillator device with fluidic gates in a closed state as depicted in FIG. 3B, in accordance with an embodiment.

FIG. 4A illustrates a fluidic oscillator device with fluidic gates in an open state, in accordance with an embodiment.

FIG. 4B illustrates a fluidic oscillator device with fluidic gates in a closed state, in accordance with an embodiment.

FIG. 4C illustrates a lateral sectional view of the fluidic oscillator device with fluidic gates in a closed state depicted in FIG. 4A, in accordance with an embodiment.

FIG. 4D illustrates a lateral sectional view of the fluidic oscillator device with fluidic gates in a closed state as depicted in FIG. 4B, in accordance with an embodiment.

Figure 2:
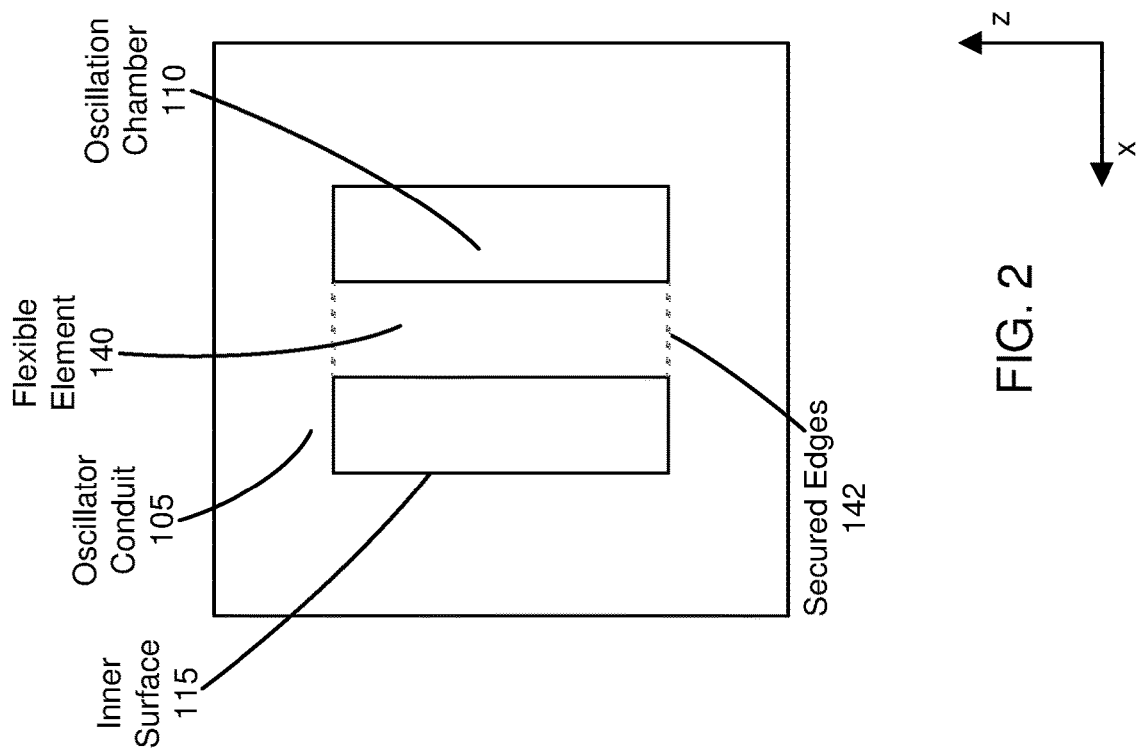
FIG. 2 is a cross sectional view of the fluidic oscillator device illustrated in FIG. 1 in accordance with an embodiment.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

Fluidic Oscillators

FIG. 1A is a planar sectional view 100 of a fluidic oscillator device 102 in the X-Y plane, in accordance with an embodiment. FIG. 1B is a lateral sectional view 100 in the Y-Z plane of the fluidic oscillator device 102 illustrated in FIG. 1A, in accordance with an embodiment. The fluidic device 102 is merely one example, and in other embodiments, the fluidic device 100 may include additional, fewer, or different components.

The fluidic oscillator device 102 includes an oscillator conduit 105, which forms an oscillator chamber 110, an inlet 120 to the oscillator chamber 110, and an outlet 130 to the oscillator chamber 110. The oscillator conduit 105 has an inner surface that bounds the oscillator chamber 110. The inner surface 115 refers to a portion of the oscillator conduit 105 in contact with fluid flowing between the inlet 120 and outlet 130. For example, the inner surface 115 may have the shape of a cylindrical surface, a tapered cylindrical surface, or some other shape.

The oscillator chamber 110 further includes a flexible element 140. The flexible element 140 may be mechanically coupled to a portion of the inner surface 115. In an embodiment, the flexible element 140 is mechanically secured to the inner surface 115 along two or more secured edges 142. A secured edge 142 is attached to the inner surface 115 by e.g., a coupling between a bulging portion of the secured edge 142 and a groove in the inner surface 115, an adhesive, one or more fasteners, or some combination thereof. Alternatively, or additionally, a secured edge 142 is fused to the inner surface 115 as a result of, e.g., co-casting. The flexible element 140 includes two or more unsecured edges, each between two of the secured edges 142. That is, in an exemplary embodiment there is a gap between the unsecured edges and the inner surface 115 of the oscillator conduit 105 so that fluid may pass between the unsecured edges and the inner surface 115. For example, the flexible element includes two edges secured to opposite sides of the inner surface 115 and two unsecured edges opposite to each other. Typically, the flow of fluid from the inlet 120 to the outlet 130 resulting in a maximal flow rate through the oscillator conduit 105 is known as the open state.

The fluid flow exerts a force on the flexible element 140 parallel to the overall direction of the fluid flow between the inlet 120 and the outlet 130. For example, in FIG. 1 the fluid flow exerts a force on the flexible element 140 parallel to the Y-axis. As a result, the flexible element 140 deforms in a direction parallel to the fluid flow such that the portions of the flexible element 140 farther from the secured edges 142 deflect farther than the portions of the flexible element 140 toward the outlet 130. In one embodiment, a flexible element 140 comprises an inner portion (e.g., center) and an outer portion which circumscribes the inner portion. In one embodiment, the inner portion (e.g., center) of the flexible element 140 deflects toward the outlet 130, and the outer portion of the flexible element 140 (e.g., the portion of the flexible element 140 which circumscribes the inner portion) contacts (e.g., forms a full or partial contact) the portion of the oscillator conduit 105 proximal to the outlet 130. In one or more embodiments, the formation of a contact between outlet 130 and the outer portion of the flexible element 140 results in a decrease in the fluid flow rate through the oscillator conduit 105. In other words, the oscillator chamber 110 enters the closed state.

In some embodiments, the portion of the inner surface 115 closest to the outlet 130 includes an exit protrusion 117. The exit protrusion 117 extends away from the outlet 130, parallel to the Y-axis, toward the flexible element 140. The exit protrusion 117 may encircle the outlet 130 such that a deflection of the flexible element 140 as a result of fluid flow, the flexible element 140 contacts the exit protrusion 117. If the contact between the outer portion of the flexible element 140 and the exit protrusion 117 encircles the outlet 130, then the flexible element 140 may temporarily form a seal with the exit protrusion 117, and the fluid flow rate may become zero (e.g., closed state).

The oscillator conduit 105 may be made from a variety of materials, including, for example, silicone, rubber, fabric, or a combination thereof.

The fluidic device 100 may include one or more pumps, actuators, valves, other fluidic devices, other hydraulic devices, or any combination thereof. The one or more hydraulic devices (not illustrated) apply a pressure differential between the inlet 120 and the outlet 130. By varying the pressure differential, the hydraulic devices control the fluid flow rate through the oscillator chamber 110 and according may control whether oscillations occur and the frequency of those oscillations.

FIG. 1C is a planar sectional view 100 in the X-Y plane of a fluidic oscillator device 102 illustrated in FIG. 1A in a closed state, in accordance with an embodiment. FIG. 1D is a lateral sectional view 100 in the Y-Z plane of the fluidic oscillator device 102 illustrated in FIG. 1C in the closed state, in accordance with an embodiment. In contrast, FIGS. 1A and 1B illustrate the fluidic oscillator device 110 in the open state.

In various embodiments, a threshold fluid flow rate parallel to the Y-axis through the oscillator conduit results in a transition of the oscillator conduit from the open state to the closed state. For example, a fluid flow rate through the secured edges 142 of the flexible element 140 remain secured to the inner surface 115 in the closed state but the outer portion of the flexible element 140 contacts the exit protrusion 117. In various embodiments, the exit protrusion 117 beneficially reduces the fluid pressure differential between the inlet 120 and the outlet 130 used to obtain fluidic oscillations.

While the fluidic oscillator is in the closed state, the reduced flow rate through the oscillator conduit 105 results the accumulation of fluid in the oscillator chamber 110, resulting in an increase in pressure on the inner surface 115. In various embodiments, the increase in pressure on the inner surface 115 causes the oscillator conduit 105 to expand along the Z-axis such that a diameter of the oscillator chamber 410 increases. That is the buildup of pressure in the oscillator chamber 110 results in a corresponding increase in oscillator chamber 110 volume to relieve the increasing pressure. This increase of applied force on the inner surface 115 results in a corresponding increase in the volume of the oscillator chamber 110 thus causing the formation of a tension force on the flexible element 140. In various embodiments, the tension force pulls the flexible element 140 away from the exit protrusion 117 thus resulting in a transition from the closed state to the open state. The outward deformation of the oscillator conduit 105 increases the distance between the secured edges 142 of the flexible element 140 resulting in a tensile force which pulls the outer portion of the flexible element 140 back from the exit protrusion 117. In other words, the flexible element 140 rebounds from the closed state into the open state and the fluid flow rate increases, once again, to a maximal value.

In various other embodiments, the flexible element 140 oscillates between the open state and the closed state, causing an oscillation in the fluid flow rate. As the fluid flow rate changes, the fluid exerts variable drag force on the inner surface 115 and the flexible element 140. A consequence of the variable drag force is a mechanical vibration of the oscillator conduit 105. The mechanical vibration has a frequency similar to the oscillation frequency of the flexible element 140 between the open state and the closed state. The distance between the flexible element 140 and the exit surface, the cross-sectional area of the flexible element, and the cross-sectional area of the oscillator chamber 110 each affect the frequency of the oscillation and mechanical vibrations. Additionally, the material properties (e.g., elastic modulus, Poisson's ratio) of the oscillator conduit 105 and flexible element 140 affect the frequencies of the oscillation and mechanical vibrations. For example, the oscillator conduit 105 may oscillate at frequencies on the order of, e.g., a few Hertz (Hz) (e.g., approximately 5 Hz), 10s of Hz, or 100s of Hz, in response to a fluid flowing through the oscillator conduit 105 along the y-axis.

FIG. 2 is a cross sectional view of the fluidic oscillator device 102 illustrated in FIG. 1 in accordance with an embodiment. As illustrated in FIG. 2, the oscillator conduit 105, and inner surface 115 have cylindrical shapes. The flexible element 140 has a roughly rectangular shape and is physically secured to the inner surface 115 via secured edges 142. In other embodiments, the oscillator conduit 105 and inner surface 115 have cylindrical shapes. The flexible element 140 has a roughly rectangular shape with additional rounded portions along the secured edges 142.

Gated Fluidic Oscillators

Figures 3A, 3B:
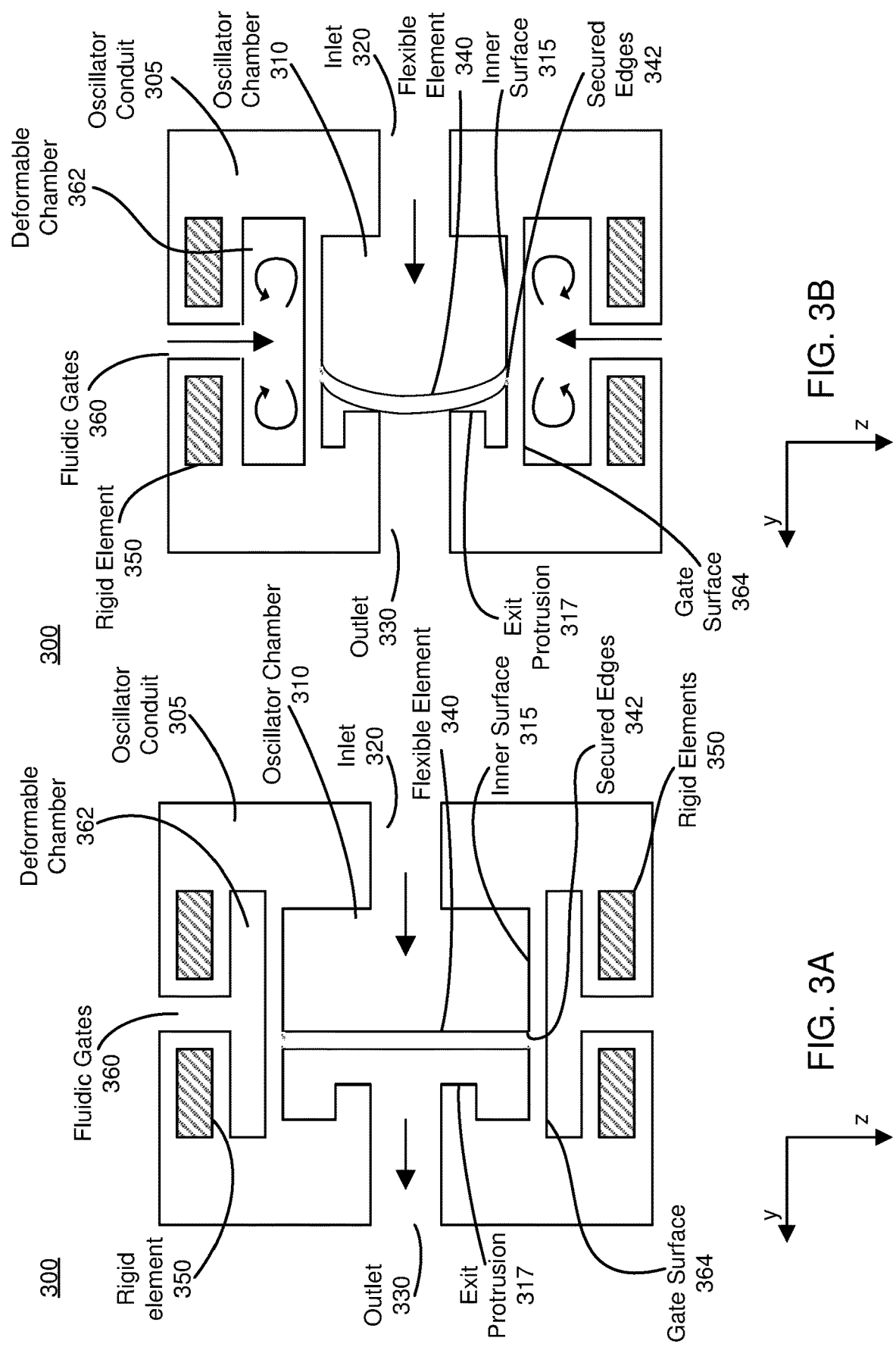
FIG. 3A illustrates a fluidic oscillator device with fluidic gates in an open state, in accordance with embodiment.
FIG. 3B illustrates a fluidic oscillator device with fluidic gates in a closed state, in accordance with an embodiment.

FIGS. 3A and 3B both show a planar sectional view of a lateral section in the Y-Z plane of a fluidic oscillator device 302 with fluidic gates, in accordance with an embodiment. FIG. 3A illustrates a fluidic oscillator device 302 with fluidic gates in an open state, in accordance with embodiment. FIG. 3B illustrates a fluidic oscillator device 302 with fluidic gates in a closed state, in accordance with an embodiment. The fluidic oscillator devices with fluidic gates 302 is merely one example, and in other embodiments, the fluidic oscillator devices with fluidic gates 302 may include additional, fewer, or different components.

The fluidic oscillator device 302 includes an oscillator conduit 305 forming an oscillator chamber 310 bounded by an inner surface 315 of the oscillator conduit 305. Fluid flows from inlet 320, into the oscillator chamber 310, around the flexible element 340, and out through outlet 330. The portion of the inner surface 315 proximal to the outlet 330 may include an exit protrusion 317. In one or more embodiments, the oscillator conduit 305, oscillator chamber 310, inner surface 315, inlet 320, outlet 330, exit protrusion 317, flexible element 340, and secured edges 342 are substantially the same as oscillator conduit 105, oscillation chamber 110, inner surface 115, inlet 120, outlet 130, exit protrusion 117, flexible element 140, and secured edges 142, respectively. These components were described in further detail with respect to FIGS. 1A through 1E, so duplicate description of these components will be omitted.

The oscillator conduit 305 further includes one or more fluidic gates 360. A fluidic gate 360 includes a deformable chamber 362 adjacent to the oscillator chamber 310. The fluidic gate 360 is formed in part by a gate surface 364 of the oscillator conduit 305. The gate surface 364 is adjacent to the inner surface 315 and faces in an opposite direction from the inner surface 315. A portion of the oscillator conduit 305 between the inner surface 315 and the gate surface 364 separates the oscillator chamber 310 from the deformable chamber 362 of the fluidic gate 360. The oscillator conduit 305 may include multiple fluidic gates 360 having distinct deformable chambers 362.

The fluidic gate 360 enables the deformable chamber 362 to be reversibly filled with a control fluid. In one or more embodiments, the control fluid is the same as the fluid which flows through the oscillator chamber 310. In one or more embodiments, as the control fluid fills the deformable chamber 362, the pressure of the control fluid inside the deformable chamber 362 increases. This increase in pressure may result in a corresponding increase in the volume of the deformable chamber 362. In an embodiment, this increase in the volume of the deformable chamber 362 causes the deformable chamber 362 to expand along the Z-axis into the oscillator chamber 310. As described further below, in conjunction with FIG. 3B, the bulging deformable chamber 362 pushes the inner surface 315 and gate surface 364 inwards, which reduces the cross-sectional area of the oscillator chamber 310. In still other embodiments, a reduction in the cross-sectional area of the oscillator chamber 310 constricts the fluid flow in the oscillator chamber 310 from the inlet 320 to outlet 330 parallel to the y-axis. Additionally, the deformation of the inner surface 315 reduces the distance between secured edges of the flexible element 340, resulting in increased displacement of the flexible element 340 for a given fluid flow rate due to decreased tension within the flexible element 340. Accordingly, changes in the control pressure may modify the oscillation frequency of the fluidic oscillator device 302 with fluidic gates at a given pressure differential between the inlet and outlet. The control pressure may also modify the threshold pressure differential that triggers fluidic oscillations.

The fluidic oscillator device 302 with fluidic gates optionally includes one or more rigid elements 350 adjacent to the deformable chambers 362. The rigid elements 350 are concentric with the deformable chambers 362, which are disposed between the rigid elements 350 and the oscillator chamber 310. The rigid elements 350 may completely encircle the oscillator chamber 310 and may include holes to form the entrance of the fluidic gate 360 into the deformable chambers 362. In some embodiments, a rigid element 350 partially encircles the oscillator chamber 310 in alignment with a corresponding deformable chamber 362.

A rigid element 350 is made from a material having a higher modulus of elasticity than the oscillator conduit 305. For example, the rigid element 350 is made from a hard plastic, semi-rigid fabric, or rigid fabric. Since the rigid element 350 deforms less than the oscillator conduit 305, the rigid element 350 resists deformation of the outermost surface of the deformable chamber 362 opposite the gate surface 364. As a result, the pressure in the deformable chamber 362 is relieved by increased deformation of the gate surface 364 and inner surface 315. Thus, the rigid element 350 causes increased constriction of the oscillator chamber 310 for a given control pressure. Thus they cause increased constriction of the deformable chamber for a given input volume associated with the deformable chamber 362. For example, the same control pressure applied to the fluidic gate 360 will always result in same deformation of the deformable chamber 362. In other words, the rigid elements 350 placed around the outside may cause the fluidic device to transition from an open state to a closed state faster (e.g., over a shorter time scale).

In FIG. 3B, the flow of the control fluid into the deformable chamber 362 via the fluidic gate 360 causes the deformable chamber to extend towards the oscillator chamber 310. In one or more embodiments, an extension of the deformable chamber 362 may result in a contraction in the volume of the oscillator chamber 310 in a direction parallel to the Z-axis resulting in a deflection of the flexible element 340. That is, when the deformable chamber 362 is filled by a control fluid to a threshold level, the flexible element 340 deflects (e.g., flexes, bends, or otherwise deforms). In various embodiments, the deformation of the flexible element 340 causes the flexible element 340 to deform towards the outlet 330 such that the exit protrusion 317 contacts the flexible element 340. For example, when the deformable chamber 362 is filled with a control fluid to a threshold level between 1 and 30 pounds per square inch (PSI), the flexible element 340 deflects toward the exit protrusions 317 such that the outer portion of the flexible element 340 contacts the exit protrusions 317. As described above in conjunction with FIG. 1, contact between the outer portion of the flexible element 340 with the exit protrusion 317, results in the formation of a seal with the exit protrusion 117. The formation of a seal between the exit protrusions 317 and the flexible element 340 may result in a decrease in the fluid flow rate through the oscillator conduit 305.

FIGS. 3C and 3D both show a planar sectional view of the lateral section of a fluidic oscillator device 302 with fluidic gates in the X-Y plane, in accordance with an embodiment. FIG. 3C illustrates a lateral sectional view 300 of the fluidic oscillator device 302 with fluidic gates in an open state depicted in FIG. 3A in an open state, in accordance with an embodiment. FIG. 3D illustrates a lateral sectional view 300 of the fluidic oscillator device 302 with fluidic gates in a closed state as depicted in FIG. 3B, in accordance with an embodiment. In some embodiments (not shown), the rigid elements 352 may circumscribe the oscillator chamber 310.

FIGS. 4A and 4B both show a planar section view 400 of a lateral section of a fluidic oscillator device 402 with fluidic gates in the Y-Z plane, in accordance with an embodiment. FIG. 4A illustrates a fluidic oscillator device 402 with fluidic gates in an open state, in accordance with an embodiment. FIG. 4B illustrates a fluidic oscillator device 402 with fluidic gates in a closed state, in accordance with an embodiment. The fluidic oscillator devices with fluidic gates 402 depicted in FIGS. 4A and 4B are merely one example, and in other embodiments, the fluidic oscillator device 402 with fluidic gates may include additional, fewer, or different components.

In FIG. 4A, the fluidic oscillator device 402 with fluidic gates includes an oscillator conduit 405 forming an oscillator chamber 410 bounded by an inner surface 415 of the oscillator conduit 405. In FIG. 4A, fluid flows from inlet 420, into the oscillator chamber 410, around the flexible element 440, and out through outlet 430. The portion of the inner surface 415 proximal to the outlet 430 may include an exit protrusion 417. In one or more embodiments, the oscillator conduit 405, oscillator chamber 410, inner surface 415, inlet 420, outlet 430, exit protrusion 417, flexible element 440, and secured edges 442, are substantially the same as oscillator conduit 105, oscillation chamber 110, inner surface 115, inlet 120, outlet 130, exit protrusion 117, flexible element 140, and secured edges 142, respectively. These components were described in further detail, above, with respect to FIGS. 1A through 1E, so duplicate description of these components will be omitted. The oscillator conduit 405 further forms fluidic gates 460, which includes a deformable chamber 462 having a gate surface 464.

The fluidic oscillator device 402 with fluidic gates includes one or force concentrators 450 inside the oscillator conduit 405. In various embodiments, a force concentrator 450 is disposed between a deformable chamber 462 associated with a fluidic gate 460 and the inner surface 415 bounding the oscillator chamber 410. The force concentrator 450 includes a force reception surface 454 surface and a force concentration surface 452. The force reception surface 454 faces the gate surface 464, and the force concentration surface 452 faces the inner surface 415. In one or more embodiments, the force reception surface 454 has a greater area than the force concentration surface. In one example embodiment, the force concentrator 450 is a trapezoidal prism such that the larger base of the trapezoidal prism is adjacent to the gate surface 464 while the smaller base of the trapezoidal prism faces the inner surface 415 of the oscillator chamber 410.

In one or more embodiments, the force concentration surface 452 exerts a force having a normal component greater than the normal component of a force applied to the force reception surface 454. In other words, the force concentrator 450 amplifies and generally directs forces applied from control pressure in the deformable chamber 462 towards the inner surface 415. This effect occurs because the area over which the control pressure is distributed is larger on the gate surface 464 than on the inner surface 415. Therefore, given equal control pressure, the force exerted on the gate surface 464 is greater than that on the inner surface 415. Example materials for the force concentrator 450 include hard plastic, semi-rigid fabric, rigid fabric, or a combination thereof. Typically, the force concentrator increases the deformation of the inner surface 415 for a given control pressure of the control fluid. As a result, a controller may effect a greater change in the frequency of the fluidic oscillator by applying a given control pressure.

In other embodiments, one or more force concentrators 450 may be used in combination with one or more rigid elements 350 to increase the deformation of the inner surface 415 and constriction of the oscillator chamber 410 in response to a given control pressure applied to the fluidic gate 460.

In FIG. 4B, a control fluid fills the deformable chamber 462 via a fluidic gate 460 causing a buildup of pressure within the deformable chamber 462. The increase in pressure within the deformable chamber 462, results in the exertion of a force on the gate surface 464. In one or more embodiments, the magnitude of the pressure applied to the deformable chamber 462 is proportional to the force exerted onto the gate surface 464. The exertion of a force on the gate surface 464 by the control fluid results in corresponding deformation in the inner surface 415. For example, the application of a control fluid pressure of on the top and bottom gates in FIG. 4B results in a decrease in the volume of the oscillator chamber 410.

A decrease in the volume of the oscillator chamber 410 results in a deflection of the flexible element 440 towards the outlet 430. In one or more embodiments, when the control fluid pressure within the deformable chamber 462 meets or exceeds a threshold level, the flexible element 440 deflects towards the outlet 430. For example, when the deformable chamber 462 is filled with a control fluid to a threshold level between 1 and 30 PSI, the flexible element 440 deflects toward the exit protrusions 417 such that the outer portion of the flexible element 440 contacts the exit protrusions 417. As described above in conjunction with FIG. 1, contact between the outer portion of the flexible element 440 with the exit protrusion 417. As depicted in FIG. 4B, the formation of a seal between the exit protrusions 417 and the flexible element 440 results in a decrease in the fluid flow rate through the oscillator conduit 405.

FIGS. 4C and 4D both show a planar sectional view of the lateral section of a fluidic oscillator device 402 with fluidic gates in the X-Y plane, in accordance with an embodiment. FIG. 4C illustrates a lateral sectional view of the fluidic oscillator device 402 with fluidic gates in an open state depicted in FIG. 4A, in accordance with an embodiment. FIG. 4D illustrates a lateral sectional view of the fluidic oscillator device 402 with fluidic gates in a closed state depicted in FIG. 4B, in accordance with an embodiment.

Figure 5:
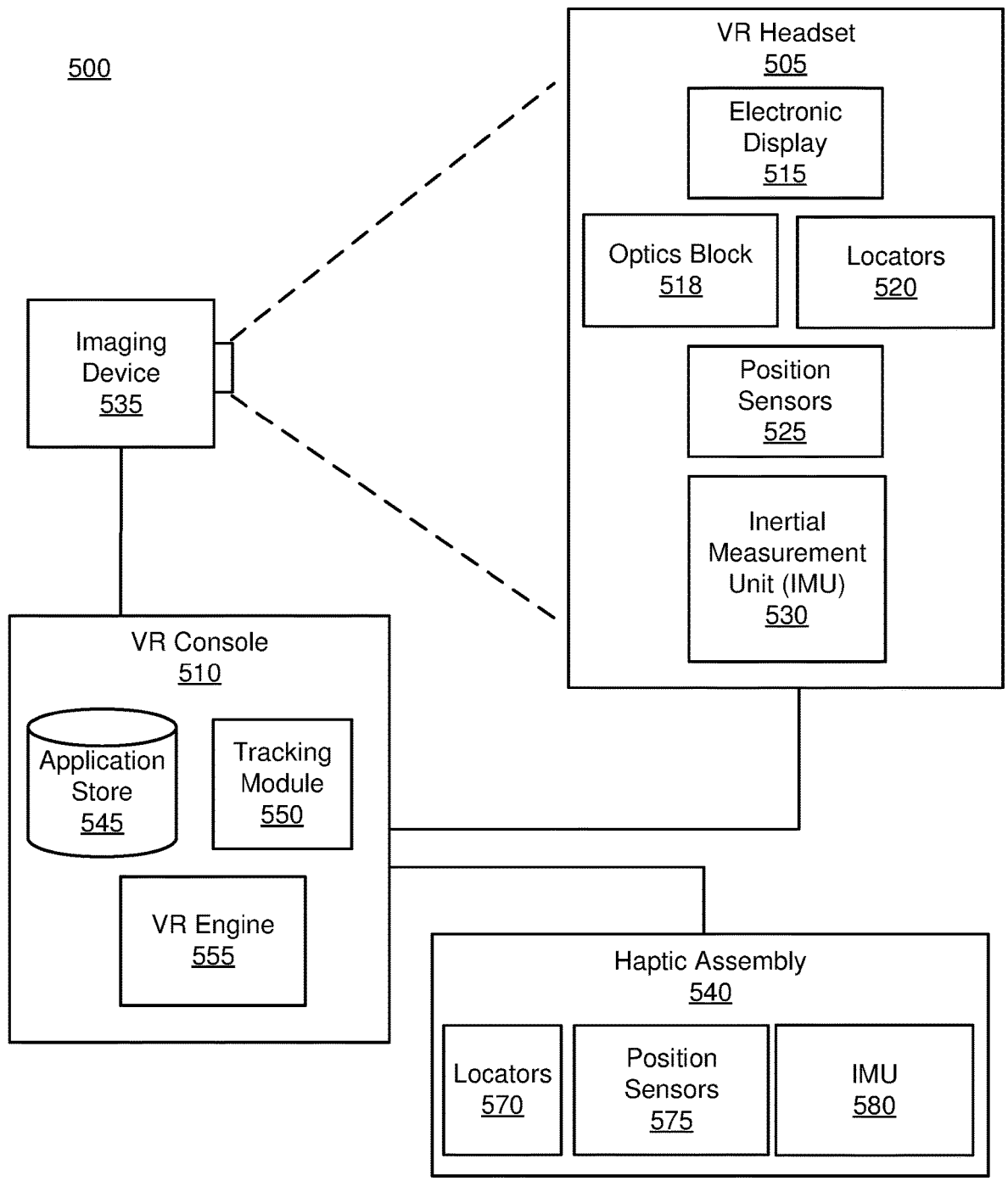
FIG. 5 is a block diagram of a system environment including a VR system, in accordance with an embodiment.

FIG. 5 is a block diagram of a system 100 including a haptic assembly 540, in accordance with one embodiment. The system 100 may operate in an artificial reality environment. The system comprises a head-mounted display (HMD) 505, an imaging device 535, and the haptic assembly 540 that are each coupled to a console 510. While FIG. 5 shows an example system 500 including one VR headset 505, one imaging device 535, and one haptic assembly 540, in other embodiments any number of these components may be included in the system 500. For example, there may be multiple VR headsets 505 each having an associated haptic assembly 540 and being monitored by one or more imaging devices 535, with each VR headset 505, haptic assembly 540, and imaging devices 535 communicating with the VR console 510. In alternative configurations, different and/or additional components may be included in the system environment 500. Additionally, in some embodiments the VR system 500 may be modified to include other system environments, such as an AR system environment.

The VR headset 505 is a head-mounted display that presents media to a user. Examples of media presented by the VR head set include one or more images, video, audio, or some combination thereof. In some embodiments, audio is presented via an external device (e.g., speakers and/or headphones) that receives audio information from the VR headset 505, the VR console 510, or both, and presents audio data based on the audio information. The VR headset 505 may comprise one or more rigid bodies, which may be rigidly or non-rigidly coupled to each other together. A rigid coupling between rigid bodies causes the coupled rigid bodies to act as a single rigid entity. In contrast, a non-rigid coupling between rigid bodies allows the rigid bodies to move relative to each other. In some embodiments, the VR headset 505 may also act as an augmented reality (AR) and/or mixed reality (MR) headset. In these embodiments, the VR headset 505 augments views of a physical, real-world environment with computer-generated elements (e.g., images, video, sound).

The VR headset 505 includes an electronic display 515, an optics block 518, one or more locators 520, one or more position sensors 525, and an inertial measurement unit (IMU) 530.

The optics block 518 magnifies received light from the electronic display 515, corrects optical errors associated with the image light, and the corrected image light is presented to a user of the VR headset 505. An optical element may be an aperture, a Fresnel lens, a convex lens, a concave lens, a filter, or any other suitable optical element that affects the image light emitted from the electronic display 515. Moreover, the optics block 518 may include combinations of different optical elements. In some embodiments, one or more of the optical elements in the optics block 518 may have one or more coatings, such as anti-reflective coatings.

The locators 520 are objects located in specific positions on the VR headset 505 relative to one another and relative to a specific reference point on the VR headset 505. A locator 520 may be a light emitting diode (LED), a corner cube reflector, a reflective marker, a type of light source that contrasts with an environment in which the VR headset 505 operates, or some combination thereof. In embodiments where the locators 520 are active (i.e., an LED or other type of light emitting device), the locators 520 may emit light in the visible band (~380 nm to 550 nm), in the infrared (IR) band (~750 nm to 1 mm), in the ultraviolet band (10 nm to 380 nm), some other portion of the electromagnetic spectrum, or some combination thereof.

In some embodiments, the locators 520 are located beneath an outer surface of the VR headset 505, which is transparent to the wavelengths of light emitted or reflected by the locators 520 or is thin enough to not substantially attenuate the wavelengths of light emitted or reflected by the locators 520. Additionally, in some embodiments, the outer surface or other portions of the VR headset 505 are opaque in the visible band of wavelengths of light. Thus, the locators 520 may emit light in the IR band under an outer surface that is transparent in the IR band but opaque in the visible band.

The IMU 530 is an electronic device that generates fast calibration data based on measurement signals received from one or more of the position sensors 525. A position sensor 525 generates one or more measurement signals in response to motion of the VR headset 505. Examples of position sensors 525 include: one or more accelerometers, one or more gyroscopes, one or more magnetometers, another suitable type of sensor that detects motion, a type of sensor used for error correction of the IMU 530, or some combination thereof. The position sensors 525 may be located external to the IMU 530, internal to the IMU 530, or some combination thereof.

Based on the one or more measurement signals from one or more position sensors 525, the IMU 530 generates fast calibration data indicating an estimated position of the VR headset 505 relative to an initial position of the VR headset 505. For example, the position sensors 525 include multiple accelerometers to measure translational motion (forward/back, up/down, left/right) and multiple gyroscopes to measure rotational motion (e.g., pitch, yaw, and roll). In some embodiments, the IMU 530 rapidly samples the measurement signals and calculates the estimated position of the VR headset 505 from the sampled data. For example, the IMU 530 integrates the measurement signals received from the accelerometers over time to estimate a velocity vector and integrates the velocity vector over time to determine an estimated position of a reference point on the VR headset 505. Alternatively, the IMU 530 provides the sampled measurement signals to the VR console 510, which determines the fast calibration data. The reference point is a point that may be used to describe the position of the VR headset 505. While the reference point may generally be defined as a point in space; however, in practice the reference point is defined as a point within the VR headset 505 (e.g., a center of the IMU 530).

The IMU 530 receives one or more calibration parameters from the VR console 510. As further discussed below, the one or more calibration parameters are used to maintain tracking of the VR headset 505. Based on a received calibration parameter, the IMU 530 may adjust one or more IMU parameters (e.g., sample rate). In some embodiments, certain calibration parameters cause the IMU 530 to update an initial position of the reference point so it corresponds to a next calibrated position of the reference point. Updating the initial position of the reference point as the next calibrated position of the reference point helps reduce accumulated error associated with the determined estimated position. The accumulated error, also referred to as drift error, causes the estimated position of the reference point to "drift" away from the actual position of the reference point over time.

The imaging device 535 generates slow calibration data in accordance with calibration parameters received from the VR console 510. Slow calibration data includes one or more images showing observed positions of the locators 520 that are detectable by the imaging device 535. The imaging device 535 may include one or more cameras, one or more video cameras, any other device capable of capturing images including one or more of the locators 520, or some combination thereof. Additionally, the imaging device 535 may include one or more filters (e.g., used to increase signal to noise ratio). The imaging device 535 is designed to detect light emitted or reflected from locators 520 in a field of view of the imaging device 535. In embodiments where the locators 520 include passive elements (e.g., a retroreflector), the imaging device 535 may include a light source that illuminates some or all of the locators 520, which retroreflect the light towards the light source in the imaging device 535. Slow calibration data is communicated from the imaging device 535 to the VR console 510, and the imaging device 535 receives one or more calibration parameters from the VR console 510 to adjust one or more imaging parameters (e.g., focal length, focus, frame rate, ISO, sensor temperature, shutter speed, aperture).

The haptic assembly 540 is a device that allows a user to send action requests to the VR console 510. An action request is a request to perform a particular action. For example, an action request may be to start or end an application or to perform a particular action within the application. The haptic assembly 540 also provides haptic feedback including a perception of contacting a virtual object. In one embodiment, the haptic assembly 540 includes a plurality of modular fluidic devices that form one or more composite fluidic devices (e.g., the fluidic oscillators and fluidic oscillator devices with fluidic gates described above in conjunction with FIGS. 1-4). The composite fluidic devices may be used to apply haptic feedback forces (e.g., vibrations, pressure) to a wearer of the haptic assembly 540 according to the haptic feedback signal from the VR console 510. In one embodiment, as more fully described below in FIG. 6, the haptic assembly 540 is a haptic glove that provides inputs to the VR console 510 and accordingly enables a user to interact with a virtual object.

In FIG. 5, the haptic assembly 540 further includes locators 570, one or more position sensors 575, and an inertial measurement unit (IMU) 580. In some embodiments, the locators 570, one or more position sensors 575, an inertial measurement unit (IMU) 580 are installed to determine a physical position or movement of the haptic assembly 540. In addition, the haptic assembly 540 receives, from the VR console 510, a haptic feedback signal corresponding to haptic feedback to the user. The haptic assembly 540 provides to the user with the haptic feedback of touching a virtual object in a virtual space, according to the haptic feedback signal. Specifically, the haptic assembly 540 prevents or enables a physical movement of a portion of a user in contact with the virtual object in the virtual space. For example, if a user's finger is in contact with a virtual object (e.g., a virtual wall) in a virtual space, the haptic assembly 540 prevents a physical movement of the user finger to move in a direction through the virtual object in the virtual space. Accordingly, the user can receive a perception of contacting the virtual object.

In one embodiment, the haptic feedback signal indicates a position or a portion of the haptic assembly 540 to be actuated, and an amount of actuation of the position or the portion of the haptic assembly 540 for providing haptic feedback. In this embodiment, the amount of actuation is determined by, e.g., the VR console 510, according to a virtual position of the haptic assembly 540 corresponding to a physical position of the haptic assembly 540 and a virtual position of a virtual object in a virtual space. The haptic assembly 540 provides tactile perception of a user touching the virtual object according to the amount of actuation indicated by the haptic feedback signal.

The locators 570 are objects located in specific positions on the haptic assembly 540 relative to one another and relative to a specific reference point of the haptic assembly 540 on the haptic assembly 540. A locator 570 is substantially similar to a locator 520 except that the locator 570 is part of the haptic assembly 540. Additionally, in some embodiments, the outer surface or other portions of the haptic assembly 540 are opaque in the visible band of wavelengths of light. Thus, the locators 570 may emit light in the IR band under an outer surface that is transparent in the IR band but opaque in the visible band.

A position sensor 575 generates one or more measurement signals in response to motion of the haptic assembly 540. The position sensors 575 are substantially similar to the positions sensors 525, except that the position sensors 575 are part of the haptic assembly 540. The position sensors 575 may be located external to the IMU 580, internal to the IMU 580, or some combination thereof.

Based on the one or more measurement signals from one or more position sensors 575, the IMU 580 generates fast calibration data of the haptic assembly 540 indicating an estimated position of the haptic assembly 540 relative to an initial position of the haptic assembly 540. For example, the position sensors 575 include multiple accelerometers to measure translational motion (forward/back, up/down, left/ right) and multiple gyroscopes to measure rotational motion (e.g., pitch, yaw, and roll) of the haptic assembly 540. In some embodiments, the IMU 580 rapidly samples the measurement signals and calculates the estimated position of the haptic assembly 540 from the sampled data. For example, the IMU 580 integrates the measurement signals received from the accelerometers over time to estimate a velocity vector and integrates the velocity vector over time to determine an estimated position of a reference point of the haptic assembly 540. Alternatively, the IMU 580 provides the sampled measurement signals to the VR console 510, which determines the fast calibration data of the haptic assembly 540. The reference point of the haptic assembly 540 is a point that may be used to describe the position of the haptic assembly 540. While the reference point of the haptic assembly 540 may generally be defined as a point in space; however, in practice the reference point of the haptic assembly 540 is defined as a point within the haptic assembly 540 (e.g., a center of the IMU 580).

The IMU 580 receives one or more calibration parameters of the haptic assembly 540 from the VR console 510. As further discussed below, the one or more calibration parameters of the haptic assembly 540 are used to maintain tracking of the haptic assembly 540. Based on a received calibration parameter of the haptic assembly 540, the IMU 580 may adjust one or more IMU parameters (e.g., sample rate). In some embodiments, certain calibration parameters of the haptic assembly 540 cause the IMU 580 to update an initial position of the reference point of the haptic assembly 540 so it corresponds to a next calibrated position of the reference point of the haptic assembly 540. Updating the initial position of the reference point of the haptic assembly 1840 as the next calibrated position of the reference point of the haptic assembly 540 helps reduce accumulated error associated with the determined estimated position.

The VR console 510 provides media to the VR headset 505 for presentation to the user in accordance with information received from one or more of: the imaging device 535, the VR headset 505, and the haptic assembly 540. In the example shown in FIG. 5, the VR console 510 includes an application store 545, a tracking module 550, and a virtual reality (VR) engine 555. Some embodiments of the VR console 510 have different modules than those described in conjunction with FIG. 5. Similarly, the functions further described below may be distributed among components of the VR console 510 in a different manner than is described here.

The application store 545 stores one or more applications for execution by the VR console 510. An application is a group of instructions, that when executed by a processor, generates content for presentation to the user. Content generated by an application may be in response to inputs received from the user via movement of the VR headset 505 or the haptic assembly 540. Examples of applications include: gaming applications, conferencing applications, video playback application, or other suitable applications.

The tracking module 550 calibrates the VR system 500 using one or more calibration parameters and may adjust one or more calibration parameters to reduce error in determination of the position of the VR headset 505. For example, the tracking module 550 adjusts the focus of the imaging device 535 to obtain a more accurate position for observed locators on the VR headset 505. Moreover, calibration performed by the tracking module 550 also accounts for information received from the IMU 530. Additionally, if tracking of the VR headset 505 is lost (e.g., the imaging device 535 loses line of sight of at least a threshold number of the locators 520), the tracking module 550 re-calibrates some or all of the system environment 500.

The tracking module 550 tracks movements of the VR headset 505 using slow calibration information from the imaging device 535. The tracking module 550 determines positions of a reference point of the VR headset 505 using observed locators from the slow calibration information and a model of the VR headset 505. The tracking module 550 also determines positions of a reference point of the VR headset 505 using position information from the fast calibration information. Additionally, in some embodiments, the tracking module 550 may use portions of the fast calibration information, the slow calibration information, or some combination thereof, to predict a future location of the headset 505. The tracking module 550 provides the estimated or predicted future position of the VR headset 505 to the VR engine 555.

The VR engine 555 executes applications within the system environment 500 and receives position information, acceleration information, velocity information, predicted future positions, or some combination thereof of the VR headset 505 from the tracking module 550. Based on the received information, the VR engine 555 determines content to provide to the VR headset 505 for presentation to the user. For example, if the received information indicates that the user has looked to the left, the VR engine 555 generates content for the VR headset 505 that mirrors the user's movement in a virtual environment. Additionally, the VR engine 555 performs an action within an application executing on the VR console 510 in response to an action request received from the haptic assembly 540 and provides feedback to the user that the action was performed. The provided feedback may be visual or audible feedback via the VR headset 505 or haptic feedback via the haptic assembly 540.

Figure 6:
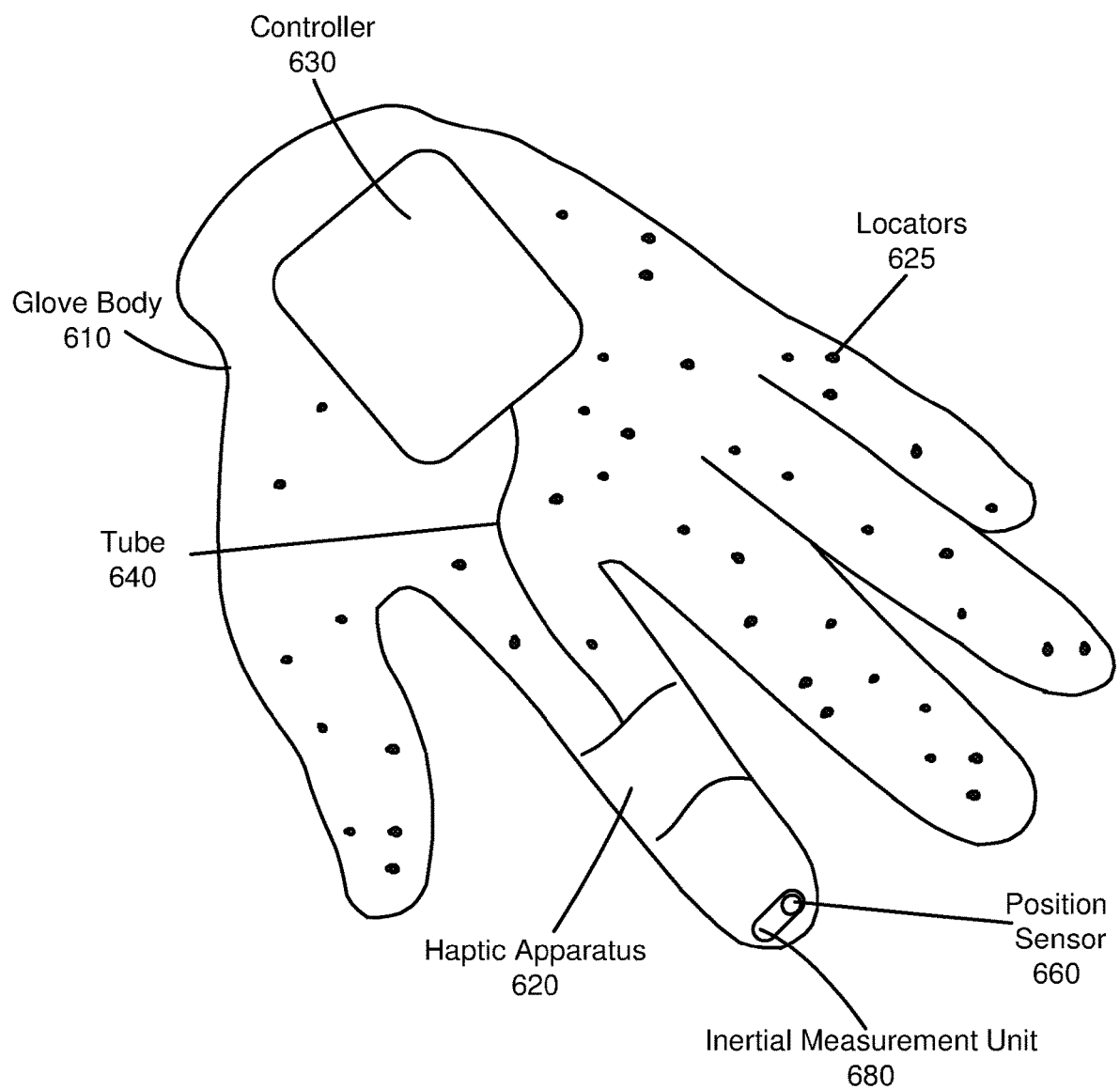
FIG. 6 is an example haptic glove for interacting with virtual objects, in accordance with an embodiment.

FIG. 6 is an example haptic glove 600 for interacting with virtual objects, in accordance with an embodiment. The haptic glove 600 shown in FIG. 6 includes a glove body 610, a haptic apparatus 620, a controller 630, a signaling path 640, one or more locators 625, a position sensor 660, and an IMU 680. Only one tube 640, one haptic apparatus 620, one position sensor 660, and one IMU 680 are shown in FIG. 6 to simplify the description. In alternative embodiments not shown, the haptic glove 600 can include multiple tubes, position sensors, and haptic apparatus that are connected to the controller 630, for example, for each finger of the haptic glove 600, a set of haptic apparatus, position sensors and IMUs may be connected to the controller. Likewise, the functions performed by the various entities of the haptic glove 600 may differ in different embodiments. Additionally, the various entities of the haptic glove 600 may be positioned in different places on the glove body 610. As one example, additional haptic apparatuses 620 and the position sensors 660 are located at different parts of the glove body 610. As another example, the haptic apparatuses 620 are coupled to or wrap the entire fingers of the glove body 610. As another example, the controller 630 is coupled to a different portion of the glove body 610 corresponding to, for example a wrist or a palm.

The glove body 610 is an apparatus covering a hand, for example, a garment that is coupled to the position sensor 660, the haptic apparatus 620, the controller 630, and the tube 640. In one embodiment, the position sensor 660 is coupled to a corresponding finger of the glove body 610 (e.g., a portion corresponding to a fingertip of the glove body); the haptic apparatus 620 is coupled to a corresponding finger portion (e.g., a portion corresponding to a joint between two phalanges) of the glove body 610; and the controller 630 is coupled to a portion of the glove body 610 corresponding to a back of a hand (i.e., dorsal side). The tube 640 is coupled between the controller 630 and the haptic apparatus 620. In one embodiment, one or more of these components are placed beneath an outer surface of the glove body 610, thus are not visible from the outside. Additionally or alternatively, some of these components are placed on an outer surface of the glove body 610, and are visually detectable.

In one embodiment, the haptic glove 600 may be the haptic assembly 540 shown in FIG. 5 and the locators 625, the position sensor 660 and the IMU 680 of the haptic glove 600 may be the corresponding locators 570, position sensors 575 and IMUs 580 of the haptic assembly 540 shown in FIG. 5. A user's hand movement can be detected and tracked according to fast calibration data from the IMU 680 and/or slow calibration of the locators 625 from the imaging device 535. Moreover, haptic feedback including a perception of a user contacting a virtual object can be provided to the user by the controller 630, tube 640, and haptic apparatus 620.

The haptic apparatus 620 provides haptic feedback including a perception of a user touching a virtual object. In one embodiment, the haptic apparatus 620 is actuated according to instructions received from the controller 630. In one embodiment, the haptic apparatus 620 is coupled to a portion corresponding to a joint between two phalanges of the glove body 610. In another embodiment, the haptic apparatus 620 covers the entire glove body 610 or are placed on other parts (e.g., an area corresponding to a joint between two different fingers) of the glove body 610. The haptic apparatus 620 may be, for example, a plurality of actuators or fluidic devices.

The controller 630 is a device that provides instructions for the haptic apparatus 620 to perform specific functions. The controller 630 may receive instructions or haptic feedback from the VR console 510 and actuates the haptic apparatus 620 accordingly. The controller 630 includes a plurality of fluidic devices that generate instructions for one or more haptic apparatuses (e.g., actuators). As discussed in detail above, fluidic devices are modular and may be coupled together to form composite fluidic devices. For example, a fluidic device includes a fluidic oscillator that may act as a system clock wherein the fluidic device is used to run fluidic logic. In another example, the fluidic device may be configured as a vibrotactile actuator and generate haptic stimulation. In still another example, the fluidic device may be configured as a pressure sensor or pressure filter wherein the frequency of oscillation of the fluidic device changes in response to an applied external pressure. The controller 630, the haptic apparatus 620, or both may be composed of a plurality of fluidic devices, including various combinations of those described above with regard to FIGS. 1A through 4.

Additional Configuration Information

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A fluidic device comprising a fluidic oscillator including:
   an oscillator conduit forming an oscillator chamber bounded by an inner surface of the oscillator conduit, the oscillator conduit further including an inlet and an outlet wherein a fluid flows through the oscillator conduit from the inlet to the outlet; and
   a flexible element inside the oscillator chamber and adjacent to the inlet, the flexible element having at least two opposing edges coupled to the inner surface of the oscillator conduit, wherein the flexible element is configured to deform towards the outlet based on a rate of fluid flow between the inlet and the outlet, the rate of fluid flow is controllable via a pressure differential between the inlet and the outlet.

2. The fluidic device of claim 1, wherein the flexible element deforms towards the outlet responsive to the rate of fluid flow being above a threshold value.

3. The fluidic device of claim 1, wherein the fluid device is configured to operate in an open state and a closed state, wherein the open state is associated with a maximum rate of fluid flow between the inlet and the outlet, and the closed state is associated with a minimum rate of fluid flow between the inlet and the outlet.

4. The fluidic device of claim 3, wherein a state of the fluidic device is configured to oscillate between the open state and the closed state at a frequency based on a distance between the flexible element and an exit surface, a cross-sectional area of the flexible element, and a cross-sectional area of the oscillator chamber.

5. The fluidic device of claim 1, further comprising a first fluidic gate located adjacent to a first side of the oscillator chamber and a second fluidic gate that is located adjacent to a second side of the oscillator chamber that is opposite the first side, and the first fluidic gate and the second fluidic gate respectively include a first deformable chamber and a second deformable chamber, the first deformable chamber and the second deformable chamber are configured to store respective volumes of a control fluid, wherein a volume of the oscillation chamber is a function of the volumes of the control fluid stored in the first deformable chamber and the second deformable chamber.

6. The fluidic device of claim 5, further comprising a first rigid element and a second rigid element that are both less flexible than the oscillator conduit, and the first deformable chamber is positioned between the first rigid element and the oscillator chamber such that expansion of the first deformable chamber is primarily in the direction of the oscillator chamber, and the second deformable chamber is positioned between the second rigid element and the oscillator chamber such that expansion of the second deformable chamber is primarily in the direction of the oscillator chamber.

7. The fluidic device of claim 5, further comprising a first force concentrator located between the first side of the oscillator chamber and the first deformable chamber and a second force concentrator that is located between the second side of the oscillator chamber and the second deformable chamber, and the first force concentrator and the second force concentrator each include a respective force reception surface and a respective force concentration surface, the force reception surface having a larger area than that of the force concentration surface such that force applied to the force reception surface is concentrated by the force concentration surface toward the oscillation chamber.

8. The fluidic device of claim 1, wherein a frequency of oscillation of the fluidic device is a function of the volume of the oscillation chamber.

9. The fluidic device of claim 1, wherein an oscillation of the fluidic device is associated with a mechanical vibration.

10. The fluidic device of claim 1, wherein a controller is configured to control the pressure differential in response to commands from a console.

11. A haptic apparatus comprising:
a plurality of fluidic devices, the fluidic devices including at least one fluidic oscillator, the fluidic oscillator comprising:
an oscillator conduit forming an oscillator chamber bounded by an inner surface of the oscillator conduit, the oscillator conduit further including an inlet and an outlet wherein fluid flows through the oscillator conduit from the inlet to the outlet; and
a flexible element inside the oscillator chamber and adjacent to the inlet, the flexible element having at least one edge coupled to the inner surface of the oscillator conduit, wherein the flexible element is configured to deform towards the outlet based on a rate of fluid flow between the inlet and the outlet, the rate of fluid flow is controllable via a pressure differential between the inlet and the outlet, wherein a state of the fluidic oscillator is configured to oscillate between the open state and the closed state at a frequency based on a distance between the flexible element and an exit surface, a cross-sectional area of the flexible element, and a cross-sectional area of the oscillator chamber.

12. The haptic apparatus of claim 11, wherein the flexible element deforms towards the outlet responsive to the rate of fluid flow being above a threshold value.

13. The haptic apparatus of claim 11, wherein the fluidic oscillator is configured to operate in an open state and a closed state, wherein the open state is associated with a maximum rate of fluid flow between the inlet and the outlet, and the closed state is associated with a minimum rate of fluid flow between the inlet and the outlet.

14. The haptic apparatus of claim 11, wherein the flexible element has at least two opposing edges coupled to the inner surface of the oscillator conduit.

15. A haptic apparatus comprising:
a plurality of fluidic devices, the fluidic devices including at least one fluidic oscillator, the fluidic oscillator comprising:
an oscillator conduit forming an oscillator chamber bounded by an inner surface of the oscillator conduit, the oscillator conduit further including an inlet and an outlet wherein fluid flows through the oscillator conduit from the inlet to the outlet; and
a flexible element inside the oscillator chamber and adjacent to the inlet, the flexible element having at least one edge coupled to the inner surface of the oscillator conduit, wherein the flexible element is configured to deform towards the outlet based on a rate of fluid flow between the inlet and the outlet, the rate of fluid flow is controllable via a pressure differential between the inlet and the outlet, wherein the fluidic oscillator further comprises a first fluidic gate located adjacent to a first side of the oscillator chamber and a second fluidic gate that is located adjacent to a second side of the oscillator chamber that is opposite the first side, and the first fluidic gate and the second fluidic gate respectively include a first deformable chamber and a second deformable chamber, the first deformable chamber and the second deformable chamber are configured to store respective volumes of a control fluid, wherein a volume of the oscillation chamber is a function of the volumes of the control fluid stored in the first deformable chamber and the second deformable chamber.

16. The haptic apparatus of claim 15, wherein the fluidic oscillator further comprises a first rigid element and a second rigid element that are both less flexible than the oscillator conduit, and the first deformable chamber is positioned between the first rigid element and the oscillator chamber such that expansion of the first deformable chamber is primarily in the direction of the oscillator chamber, and the second deformable chamber is positioned between the second rigid element and the oscillator chamber such that expansion of the second deformable chamber is primarily in the direction of the oscillator chamber.

17. The haptic apparatus of claim 15, wherein the fluidic oscillator further comprises a first force concentrator located between the first side of the oscillator chamber and the first deformable chamber and a second force concentrator that is located between the second side of the oscillator chamber and the second deformable chamber, and the first force concentrator and the second force concentrator each include a respective force reception surface and a respective force concentration surface, the force reception surface having a larger area than that of the force concentration surface such that force applied to the force reception surface is concentrated by the force concentration surface toward the oscillation chamber.

18. The haptic apparatus of claim 11, A haptic apparatus comprising:
 a plurality of fluidic devices, the fluidic devices including at least one fluidic oscillator, the fluidic oscillator comprising:
  an oscillator conduit forming an oscillator chamber bounded by an inner surface of the oscillator conduit, the oscillator conduit further including an inlet and an outlet wherein fluid flows through the oscillator conduit from the inlet to the outlet; and
  a flexible element inside the oscillator chamber and adjacent to the inlet, the flexible element having at least one edge coupled to the inner surface of the oscillator conduit, wherein the flexible element is configured to deform towards the outlet based on a rate of fluid flow between the inlet and the outlet, the rate of fluid flow is controllable via a pressure differential between the inlet and the outlet, wherein a frequency of oscillation of the fluidic oscillator is a function of the volume of the oscillation chamber associated with the fluidic device.

19. A haptic apparatus comprising:
 a plurality of fluidic devices, the fluidic devices including at least one fluidic oscillator, the fluidic oscillator comprising:
  an oscillator conduit forming an oscillator chamber bounded by an inner surface of the oscillator conduit, the oscillator conduit further including an inlet and an outlet wherein fluid flows through the oscillator conduit from the inlet to the outlet; and
  a flexible element inside the oscillator chamber and adjacent to the inlet, the flexible element having at least one edge coupled to the inner surface of the oscillator conduit, wherein the flexible element is configured to deform towards the outlet based on a rate of fluid flow between the inlet and the outlet, the rate of fluid flow is controllable via a pressure differential between the inlet and the outlet, wherein an oscillation associated with the fluidic oscillator is associated with a mechanical vibration.

20. A haptic apparatus comprising:
a plurality of fluidic devices, the fluidic devices including at least one fluidic oscillator, the fluidic oscillator comprising:
  an oscillator conduit forming an oscillator chamber bounded by an inner surface of the oscillator conduit, the oscillator conduit further including an inlet and an outlet wherein fluid flows through the oscillator conduit from the inlet to the outlet; and
  a flexible element inside the oscillator chamber and adjacent to the inlet, the flexible element having at least one edge coupled to the inner surface of the oscillator conduit, wherein the flexible element is configured to deform towards the outlet based on a rate of fluid flow between the inlet and the outlet, the rate of fluid flow is controllable via a pressure differential between the inlet and the outlet, wherein a controller is configured to control the pressure differential in response to commands from a console.

* * * * *